US010917613B1

(12) United States Patent
Chiarella et al.

(10) Patent No.: US 10,917,613 B1
(45) Date of Patent: Feb. 9, 2021

(54) VIRTUAL OBJECT PLACEMENT IN AUGMENTED REALITY ENVIRONMENTS

(71) Applicant: International Business Machines Corporation, Armonk, NY (US)

(72) Inventors: Giacomo Giuseppe Chiarella, Eastleigh (GB); Daniel Thomas Cunnington, Winchester (GB); John Jesse Wood, St Albans (GB); Eunjin Lee, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/733,274

(22) Filed: Jan. 3, 2020

(51) Int. Cl.
*H04N 7/00* (2011.01)
*H04N 7/15* (2006.01)
*G06T 11/00* (2006.01)
*G06N 20/00* (2019.01)

(52) U.S. Cl.
CPC ............ *H04N 7/157* (2013.01); *G06N 20/00* (2019.01); *G06T 11/00* (2013.01)

(58) Field of Classification Search
None
See application file for complete search history.

(56) References Cited

U.S. PATENT DOCUMENTS

| 10,057,707 | B2 | 8/2018 | Cartwright | |
|---|---|---|---|---|
| 2015/0215351 | A1* | 7/2015 | Barzuza | H04L 65/403 715/757 |
| 2017/0127023 | A1* | 5/2017 | High | G06T 7/30 |
| 2019/0227695 | A1 | 7/2019 | Shuster | |

FOREIGN PATENT DOCUMENTS

WO    2018226508 A1    12/2018

OTHER PUBLICATIONS

"HoloLens 2 'Spatial' Remote Collaboration Demo", YouTube, Feb. 24, 2019, 2 pages, <https://www.youtube.com/watch?v=3UTYxaXtc0s>.
Breen et al., "Interactive Occlusion and Automatic Object Placement for Augmented Reality", Computer Graphics Forum / vol. 15, Issue 3, Aug. 1996, 4 pages, <https://onlinelibrary.wiley.com/doi/abs/10.1111/1467-8659.1530011>.
Xu et al., "Constraint-based Automatic Placement for Scene Composition", printed on Sep. 12, 2019, 10 pages.

* cited by examiner

*Primary Examiner* — Martin Mushambo
(74) *Attorney, Agent, or Firm* — Joseph P. Curcuru

(57) ABSTRACT

Embodiments of the present invention describe virtual object placement in augmented reality environments. Embodiments describe, determining a physical meeting room structure based on the meeting data and user data and identifying, by an augmented reality device, a physical room layout in which a first user is located. Embodiments describe determining an augmented room layout for the first user based on the identified physical room layout, in which determining the augmented room layout comprises: executing an optimization algorithm, and computing an optimization score for each iteration of potential room layouts produced by the optimization algorithm. Additionally, embodiments describe generating an augmented reality representation of a meeting environment tailored to the physical room layout based on the physical meeting room structure and the augmented room layout, and displaying to the first user the augmented reality representation of the meeting environment.

20 Claims, 6 Drawing Sheets

VIRTUAL OBJECT PLACEMENT IN AUGMENTED REALITY ENVIRONMENTS

BACKGROUND OF THE INVENTION

The present invention relates generally to the field of augmented reality, and more particularly to predictive virtual reconstruction of physical environments.

Augmented reality (AR) is an interactive and augmented experience of a real-world environment where the objects that reside in the real world are enhanced by computer-generated perceptual information, sometimes across multiple sensory modalities, including visual, auditory, haptic, somatosensory, and olfactory. AR can be defined as a system having three basic features: a combination of real and virtual worlds, real-time interaction, and accurate 3D registration of virtual and real objects. The overlaid sensory information can add to the natural environment, or mask of the natural environment. The AR experience can be seamlessly interwoven with the physical world such that it is perceived as an immersive aspect of the real environment. In this way, augmented reality alters an ongoing perception of a real-world environment, whereas virtual reality completely replaces the real-world environment with a simulated or virtual one. Augmented reality is related to two largely synonymous terms: mixed reality and computer-mediated reality.

SUMMARY

Embodiments of the present invention disclose a method, a computer program product, and a system for reconstructing a physical event for virtual object placement in augmented reality environments, the computer-implemented method comprising: determining a physical meeting room structure based on the meeting data and user data; identifying, by an augmented reality device, a physical room layout in which a first user is located; determining an augmented room layout for the first user based on the identified physical room layout, wherein determining the augmented room layout comprises: executing an optimization algorithm; and computing an optimization score for each iteration of potential room layouts produced by the optimization algorithm, wherein a potential room layout receiving the highest optimization score is the augmented room layout; generating an augmented reality representation of a meeting environment tailored to the physical room layout based on the physical meeting room structure and the augmented room layout; and displaying to the first user the augmented reality representation of the meeting environment.

DETAILED DESCRIPTION

Figure 1:
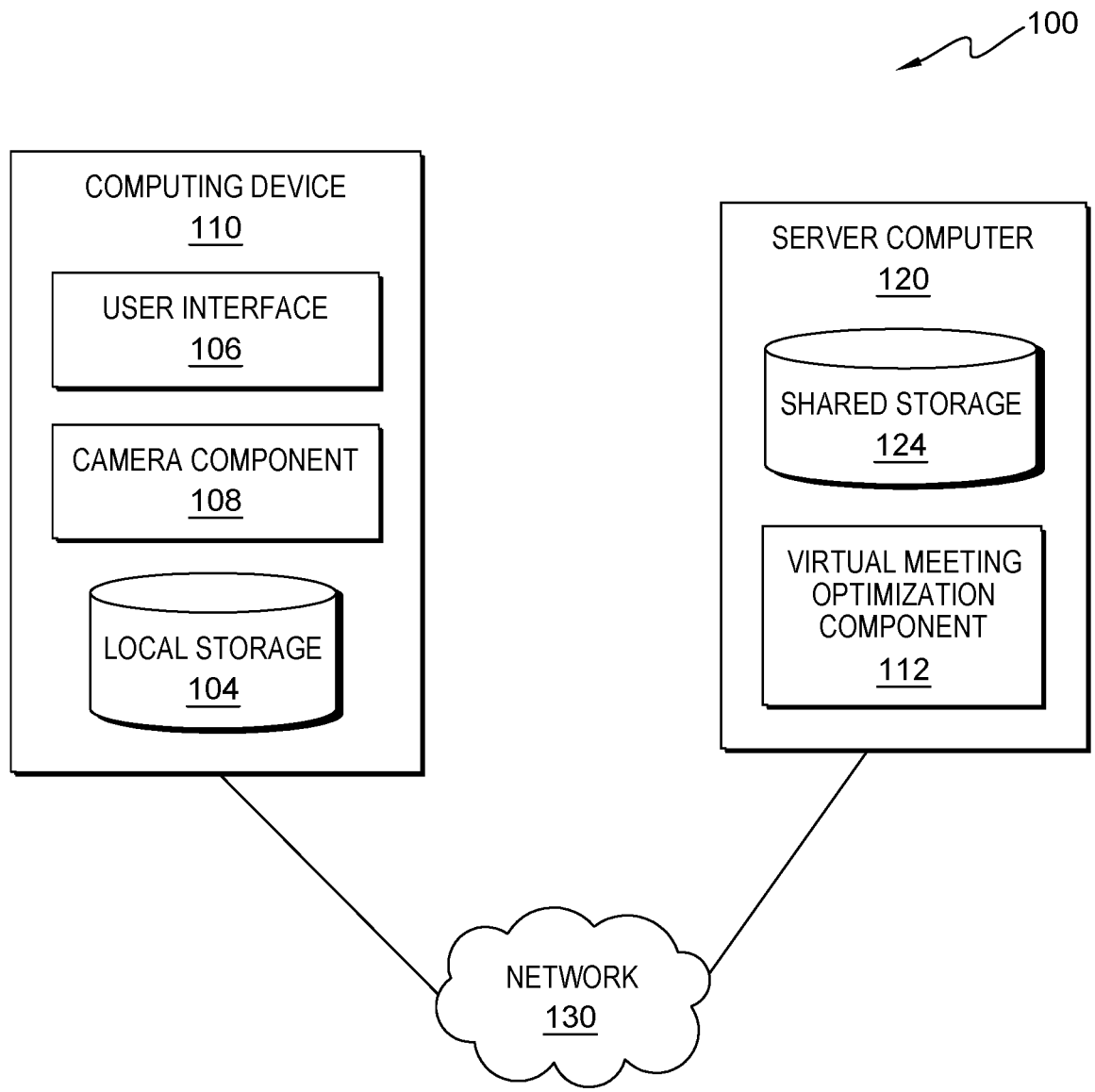
FIG. 1 is a functional block diagram illustrating a distributed data processing environment, in accordance with an embodiment of the present invention.

Consider a virtual meeting hosted in an augmented reality (AR) environment where the participants are physically distributed across multiple locations. The participants in the meeting will likely be in offices or rooms (i.e., physical rooms) that are differently shaped. An augmented reality overlay of the various physical rooms displays other participants in the meeting to create a virtual meeting experience for each participant. Currently in the art, virtual meeting systems only take into account the immediate physical conflicts of the user's space. The current art does not take into account how many people are attending the meeting or a user's need to engage in the meeting (e.g. determining whether the user is a speaker or if the user is an audience member). Additionally, the current art does not take into consideration the interactivity of elements of the virtual space. Furthermore, the current art does not consider the availability of space in each participants physical room layout and does not identify which items or participants can be suitably placed in each space and how the items or participants would be placed in each space. For example, if one participant has a small office and there are too many participants to fit in the small office.

Embodiments of the present invention can solve the issues, stated above, by considering the type of meeting and the physical room layout of the various physical rooms of the participants including specific locations within the physical rooms where virtual objects or virtual attendees could be placed (e.g. empty chairs or empty floor space). Embodiments of the present invention can utilize an optimization algorithm, similar to a genetic algorithm, to iteratively place virtual objects within the bounds of a physical room. Embodiments of the present invention can compute an optimization score based on the optimization algorithm output to determine which iteration of object and/or attendee placement suits a given context (e.g., physical room dimensions), wherein the iteration of object and/or attendee placement that has the highest optimization score is the suitable layout. Additionally, embodiments of the present invention can solve the current issues in augmented reality display for virtual meetings by determining physical locations for virtually overlaying attendees of a virtual meeting with respect to the physical room layout of physical rooms occupied by the various attendees and the type of meeting being conducted by one of the participants, such as a host participant. Embodiments of the present invention classify (i.e., categorize) the type of meeting to determine an appropriate physical meeting room structure. Some embodiments of the present invention collect physical room layout data by retrieving or receiving video and/or pictures of physical room from a camera executing on the AR headset wore by a user. For each participant, some embodiments of the present invention can process the data gained from the meeting type classification and the physical room layout of each participant to augment the real-world view of the room including virtual images of the other attendees. According to some embodiments of the present invention, a virtual meeting may be enhanced for a single participant using an AR system. For example, instead of a general virtual meeting format used for each participant embodiments of the present invention customize and tailor the virtual meeting to a particular user's office space. Some embodiments of the present invention provide an improvement over the prior art in that each of the room layouts are augmented independently whilst ensuring a similar meeting experience for each attendee. The augmented reality representations of the rooms are tailored for the real-world environments of the attendees.

Embodiments of the present invention uses higher abstraction data of the virtual meeting, such as meeting size (such as number of attendees), meeting type (lecture, panel discussion, planning session), and interactive elements in order to determine an appropriate physical location for placing virtual participants and virtual objects for each AR user. An appropriate physical location is determined by user preferences, layout of a physical room, dimensions of a physical room, optimization algorithm, and the calculated optimization score, wherein the appropriate physical location to place a virtual user and/or a virtual object will have the highest optimization score. The phrase "place a virtual user" or "place a virtual object" refers to virtually displaying and/or overlaying a virtual user or a virtual object. Embodiments of the present invention focus on placing virtual objects in different virtual/augmented geometries. Embodiments of the present invention can determine a suitable placement of participants and objects located in one real-world room as virtual participants and objects in another real-world room located in a remote region given the difference in physical layouts of the remote and local rooms. Embodiments of the present invention can place virtual objects and virtual other users based on certain aspects of the meeting, such as the role of the viewing user and the type of meeting being held. Embodiments of the present invention can virtually organize an audience with respect to each participant's physical room to simulate a physical in person meeting.

Embodiments of the present invention can utilize the interactive components of the augmented reality space to improve the layout in a physical room. Parameters of the interactive components can pre-configured. Examples of pre-configured interactive components comprise of: sound interaction (e.g., hearing the speaker/host), visual interaction (e.g., viewing a presentation), and contact interaction (e.g., a physical model or display model that is interactive). Components to be rendered can be prioritized by the AR/VR headset following the parameters above. For example, in a department meeting, the user needs to hear and see the speaker/host (i.e., speaker component), hear the audience (audio component), and look at the presentation (e.g., whiteboard component). In this example, the audience is not rendered by the AR headset because there is limited space in the user's office, and only audio is played. In this example, the speaker is placed in the top right corner of the user's view, via the AR headset, to minimize use of space. In this example, the whiteboard in front of the user is used to render the presentation. In another example, pertaining to a one-on-one meeting, the attendees need to hear and see the speaker components and interact with an architectural diagram. The AR headset would render the speaker in an adequate location similar to the department meeting example above. However, when interaction is expected with the architectural diagram, the speaker component would be removed to make room for the diagram component.

It should be noted herein that in the described embodiments, participating parties have consented to being recorded and monitored, and participating parties are aware of the potential that such recording and monitoring may be taking place. In various embodiments, for example, when downloading or operating an embodiment of the present invention, the embodiment of the invention presents a terms and conditions prompt enabling the driver to opt-in or opt-out of participation. Similarly, in various embodiments, e-mails and texts begin with a written notification that the participants data may be recorded or monitored and may be saved, for the purpose of generating data models and personal profiles for each participant. These embodiments may also include periodic reminders of such recording and monitoring throughout the course of any such use. Certain embodiments may also include regular (e.g. daily, weekly, monthly) reminders to the participating parties that they have consented to being recorded and monitored for traffic monitoring and navigation purposes and may provide the participating parties with the opportunity to opt-out of such recording and monitoring if desired. Furthermore, to the extent that any non-participating parties' actions are monitored (for example, a personal e-mail exchange), such monitoring takes place for the limited purpose of providing profile assistance to a participating party, with protections in place to prevent the unauthorized use or disclosure of any data for which an individual might have a certain expectation of privacy.

It should be noted that user data is data associated with a user (e.g., user preferences and/or a user's role in a meeting) wherein a user is a meeting attendee, audience member, and/or host.

It should be noted that meeting data is data associated with a meeting (e.g., time, type of meeting, number of attendees, and/or any other data associated with a meeting known in the art.

It should be noted that physical room layout data is data associated with a physical room (e.g., dimensions, type of room, objects in the room, layout of the room, physical users in the room, lighting, and/or any other data associated with a physical room layout known in the art.

It should be noted that the term "display" or "virtually displays" refers to displaying the augmented reality images on a computing device (e.g., AR headset) for the user to view while the user is wearing or using the computing device.

Implementation of embodiments of the invention may take a variety of forms, and exemplary implementation details are discussed subsequently with reference to the figures (i.e., FIG. 1-FIG. 4).

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 can be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and can include wired, wireless, or fiber optic connections. Network 130 can include one or more wired and/or wireless networks that can receive and transmit data, voice, and/or video signals, including multimedia signals that include voice, data, text and/or video data. In general, network 130 can be any combination of connections and protocols that will support communications between computing device 110 and server computer 120, and any other computing devices and/or storage devices (not shown in FIG. 1) within distributed data processing environment 100.

In some embodiments of the present invention, computing device 110 can be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 can be representative of any programmable computing device or a combination of programmable computing devices capable of executing machine-readable program instructions and communicating with users of other computing devices via network 130 and/or capable of executing machine-readable program instructions and communicating with server computer 120.

In some embodiments of the present invention, computing device 110 can represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 can include an instance of user interface (interface) 106 and local storage 104. In various embodiments, not depicted in FIG. 1, computing device 110 can have a plurality of user interfaces. In other embodiments, not depicted in FIG. 1, distributed data processing environment 100 can comprise a plurality of computing devices, plurality of server computers, and/or one a plurality of networks. Computing device 110 can include internal and external hardware components, as depicted, and described in further detail with respect to FIG. 4.

In various embodiments, camera component 108 is executed on computing device 110. In some embodiments, camera component 108 can be located and/or executed anywhere within distributed data processing environment 100. Camera component 108 can be one or more cameras that are known in the art. In various embodiments, camera component 108 can provide live video feeds (video feed) of what the user is viewing to computing device 110 or more specifically virtual meeting optimization component (optimization component) 112. In various embodiments, optimization component 112 can enable computing device 110 to store the captured video feed and/or photographs to shared storage 124 and/or local storage 104. In various embodiments, camera component 108 is capable of recording, transmitting, and storing live or recorded videos and capable of taking, transmitting, and storing photographs.

User interface (interface) 106 provides an interface to predictive virtual reconstruction tool (virtual reconstruction tool) 112. Computing device 110, via user interface 106, can enable a user and/or a client to interact with optimization component 112 and/or server computer 120 in various ways, such as sending program instructions, receiving program instructions, sending and/or receiving messages, updating data, sending data, inputting data, editing data, collecting data, and/or receiving data. In one embodiment, interface 106 can be a graphical user interface (GUI) or a web user interface (WUI) and can display at least text, documents, web browser windows, user options, application interfaces, and instructions for operation. interface 106 can include data (such as graphic, text, and sound) presented to a user and control sequences the user employs to control operations. In another embodiment, interface 106 can be a mobile application software providing an interface between a user of computing device 110 and server computer 120. Mobile application software, or an "app," can be designed to run on smart phones, tablet computers and other computing devices. In an embodiment, interface 106 can enable the user of computing device 110 to at least send data, input data, edit data (annotations), collect data and/or receive data.

Server computer 120 can be a standalone computing device, a management server, a web server, a mobile computing device, one or more client servers, or any other electronic device or computing system capable of receiving, sending, and processing data. In other embodiments, server computer 120 can represent a server computing system utilizing multiple computers such as, but not limited to, a server system, such as in a cloud computing environment. In another embodiment, server computer 120 can represent a computing system utilizing clustered computers and components (e.g., database server computers, application server computers, etc.) that act as a single pool of seamless resources when accessed within distributed data processing environment 100. Server computer 120 can include internal and external hardware components, as depicted, and described in further detail with respect to FIG. 4.

Each of shared storage 124 and local storage 104 can be a data/knowledge repository and/or a database that can be written and/or read by one or a combination of optimization component 112, server computer 120 and computing device 110. In the depicted embodiment, shared storage 124 resides on server computer 120 and local storage 104 resides on computing device 110. In another embodiment, shared storage 124 and/or local storage 104 can reside elsewhere within distributed data processing environment 100, provided that each can access and is accessible by computing device 110 and server computer 120. Shared storage 124 and/or local storage 104 can each be implemented with any type of storage device capable of storing data and configuration files that can be accessed and utilized by server computer 120, such as, but not limited to, a database server, a hard disk drive, or a flash memory.

In some embodiments of the present invention, shared storage 124 and/or local storage 104 can each be a hard drive, a memory card, a computer output to laser disc (cold storage), and/or any form of data storage known in the art. In some embodiments, shared storage 124 and/or local storage 104 can each be one or more cloud storage systems and/or databases linked to a cloud network. In various embodiments, shared storage 124 and/or local storage 104 can access, store, and/or house user data, physical room data, and meeting data, and/or data shared throughout distributed data processing environment 100.

In various embodiments, optimization component 112 is executed on server computer 120. In other embodiments, optimization component 112 can be executed on computing device 110. In some embodiments, optimization component 112 can be located and/or executed anywhere within distributed data processing environment 100. In various embodiments, optimization component 112 can be connected to and communicates with computing device 110 and/or server computer 120. In various embodiments, optimization component 112 can store ledger and transaction data on local storage 104 and/or shared storage 124.

In various embodiments of the present invention, optimization component 112 can identify locations to place virtual objects in a physical room within an augmented reality application for multiple users in different physical rooms using meeting structure data and physical room layout data. In various embodiments of the present invention, optimization component 112 can receive and collect data regarding the physical room layout of a user's physical room, the type of meeting, a user's meeting preferences, the user's role in the meeting (e.g., speaker/presenter or audience member) and data regarding the interactivity required within the specific application. In various embodiments of the present invention, optimization component 112 can dynamically change the user's role if optimization component 112 detects the user speaking and/or interacting with the presented material. For example, changing the user's role from audience member to presenter. In various embodiments of the present invention, optimization component 112 can generate and display an AR responsive prompt to the user, via computing device 110 (e.g., an AR headset).

In various embodiments of the present invention, optimization component 112 can execute an optimization algorithm to determine a suitable location for the virtual objects and/or virtual participants to be placed in the augmented reality overlay of the real-world room. In various embodiments of the present invention, optimization component 112 can classifying/categorize a type of meeting (e.g. round table, board meeting) to determine an appropriate physical meeting structure and utilize the data obtained from the meeting type classification and physical room layout of each participant in different physical locations to determine appropriate locations to place virtual objects within an augmented reality application for each user in their corresponding physical locations. In various embodiments of the present invention, optimization component 112 can execute and utilize the optimization algorithm to integrate the received and collected data. In various embodiments of the present invention, optimization component 112 receives an output from the optimization algorithm, wherein optimization component 112 scores the optimization algorithm output (i.e., optimization score) and determines placement for the virtual objects and/or virtual participants within a virtual overlay of a real-world room based on the optimization score.

In various embodiments of the present invention, optimization component 112 can determine the physical meeting structure. In various embodiments of the present invention, optimization component 112 can receive and collect data associated with the type of meeting (e.g. a round-table discussion with no physical structure, presentation style with one person speaking to an audience, or another custom structure with distinct physical roles such as a board room layout where a panel of speakers is physically separated from the attendees). In various embodiments of the present invention, optimization component 112 can be linked to a user's email, via an application tool, to collect data associated with the type of meeting (meeting data), wherein optimization component 112 processes and analyzes meeting invitations using text analysis. In various embodiments of the present invention, optimization component 112 can receive meeting data from a user (e.g., the host). In various embodiments of the present invention, optimization component 112 can collect user data from the data collected from the linked email. Alternatively, a user can manually input user data into optimization component 112. In various embodiments of the present invention, optimization component 112 can observe and learn user data by monitoring and storing meetings the user has attended and/or participated in.

In various embodiments of the present invention, optimization component 112 can identify and retrieve data about the objects required in each meeting structure (e.g., slides, flipcharts, table, chairs, lighting, and special effects) from the collected or received meeting data. In various embodiments of the present invention, the meeting structure can be manually configured by the meeting owner, extracted from calendar data (e.g. a meeting with a large acceptance rate from participants is likely to be a presentation style meeting). In various embodiments of the present invention, optimization component 112 can undergo an initial training set of sample meeting recordings with annotated physical structures to train a machine learning classifier that could be used to classify new meetings. For example, optimization component 112 automatically learns the structure of the meeting by observing meeting interactions over a period of time, and classifying different meeting types based on historical interactions between participants.

In various embodiments of the present invention, optimization component 112 can collect specific data for the physical room layout of the real-world room in which the participant has joined the meeting (user's physical room) (e.g. the user's office, a meeting room, or another location). In various embodiments of the present invention, optimization component 112 can collect physical room layout data by utilizing camera component 108 (e.g., one or more cameras on a pair AR glasses), room layout blueprints, and/or other sensors in the environment (e.g., internet of things (IoT) sensors and/or IoT devices). In various embodiments of the present invention, optimization component 112 can identify physical locations to place virtual attendees and other meeting materials (e.g. presentation slides, distributed documents, or distributed materials) using spatial mapping, the collected meeting data, physical room layout data, and user data, which is described in more in FIG. 2A. In various embodiments of the present invention, optimization component 112 can use existing object detection techniques to detect the presence of desirable objects, such as empty chairs (for participants) or whiteboards/blank walls (for presentation material). Desirable objects can be predefined and/or defined by the user, via user preferences.

In various embodiments of the present invention, optimization component 112 can use similar techniques that could be used to render augmented objects and appropriate containing objects, (e.g. an augmented chair with a participant sitting on it, or an augmented whiteboard with meeting slides augmented onto it), to identify acceptable locations, wherein an acceptable location is a location in a physical room that does not obstruct the virtual displaying of attendees and/or objects, or is a location that is not occupied by a physical attendee or a physical object. In various embodiments of the present invention, optimization component 112 can identify unacceptable locations (e.g., chairs with another physical person sitting in it or desks that are being used) using the collected meeting data, physical room layout data, and user data, wherein an unacceptable location is a location in a physical room that obstructs the virtual displaying of attendees and/or objects, or is a location that is already occupied by a physical attendee or a physical object.

In various embodiments of the present invention, optimization component 112 can analyze and process the collected meeting data, user data, and physical room layout data of each participant's specific physical room layout to determine where to place augmented participants and/or presentation material in a given location. FIG. 2B illustrates an example of a presentation style meeting and FIG. 2C illustrates an example of a round-table open discussion. In various embodiments of the present invention, optimization component 112 can execute and optimization algorithm (e.g., a genetic algorithm could be defined that iteratively places objects in possible locations and computes a score for each placement). The scoring function of the optimization algorithm can attribute more points for objects being in desirable locations, along with dynamic conditions ensuring the lighting/contrast in the physical room do not interfere with the meeting data. The scoring function of the optimization algorithm can also deduct points for a solution that includes objects that overlap or otherwise conflict with real-world objects in a physical location, or virtual objects that were placed in undesirable locations. The scoring function can be maximized across a set of possible solutions to achieve a final layout decision for augmented participants with respect to a physical space and the final AR display of the virtual meeting.

In various embodiments of the present invention, optimization component 112 can virtually display audience members (i.e., attendees) and/or objects (i.e. presentation slides) in a user's physical room based on the calculated optimization score. In various embodiments of the present invention, optimization component 112 can dynamically display attendees and presentation slides in a physical room, wherein optimization component 112 can dynamically adjust the displayed virtual meeting layout (e.g., attendees and presentation slides). For example, a first and second presenter are in a conference room large enough to sit ten people. In this example, optimization component 112 virtually displays the eight audience members in the empty seats of the conference room while the first and second presenter sit in the remaining two seats. In this example, a third presenter is across the country in his office. In this example, based on the third presenter's office layout and dimensions, optimization component 112 virtually displays only the first and second presenters in the two empty chairs in the third presenter's office and virtually displays the presentation slide on the whiteboard in the third presenter's office. In this example, optimization component 112 dynamically changes the virtual display in the third presenter's office by enlarging the presentation slides and shrinking the presenters when one of the presenters is speaking or by virtually displaying an audience member when an audience member is speaking. Additionally, in this example, optimization component 112 dynamically changes the virtual meeting display by only virtually displaying the audience in the third presenter's office while the third presenter is speaking.

Figure 2A:
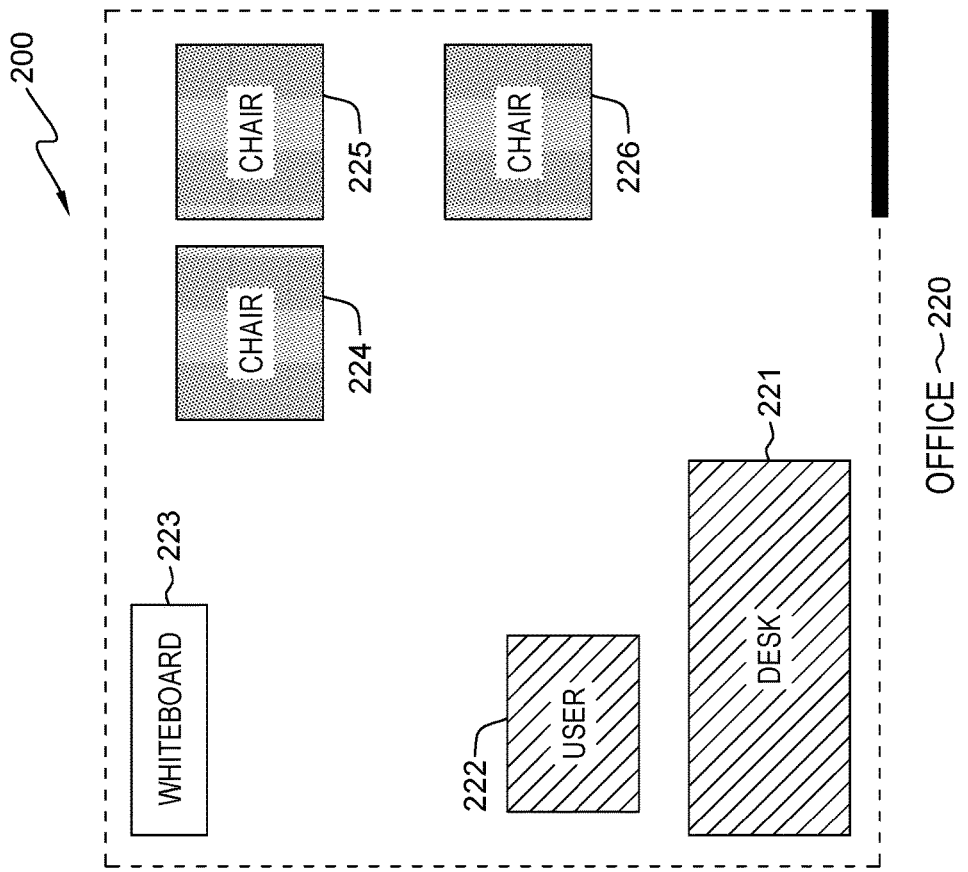
FIG. 2A is an example of virtual meeting optimization component in communication with a computing device, within the distributed data processing environment of FIG. 1, for identifying a physical room layout for each meeting attendee using an AR headset, in accordance with an embodiment of the present invention.
Figure 2A:
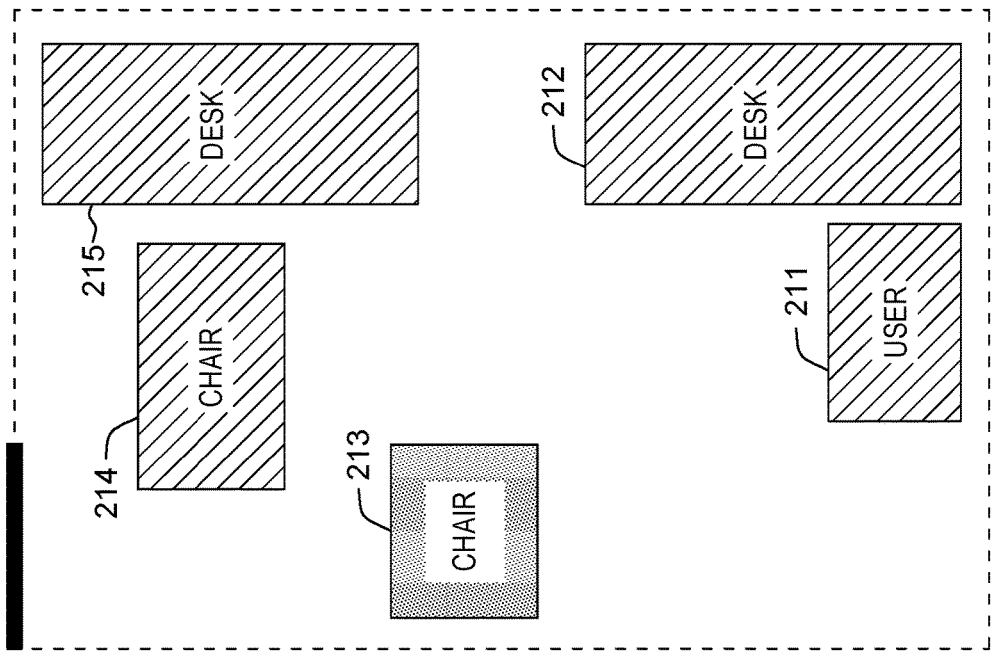
Figure 2B:
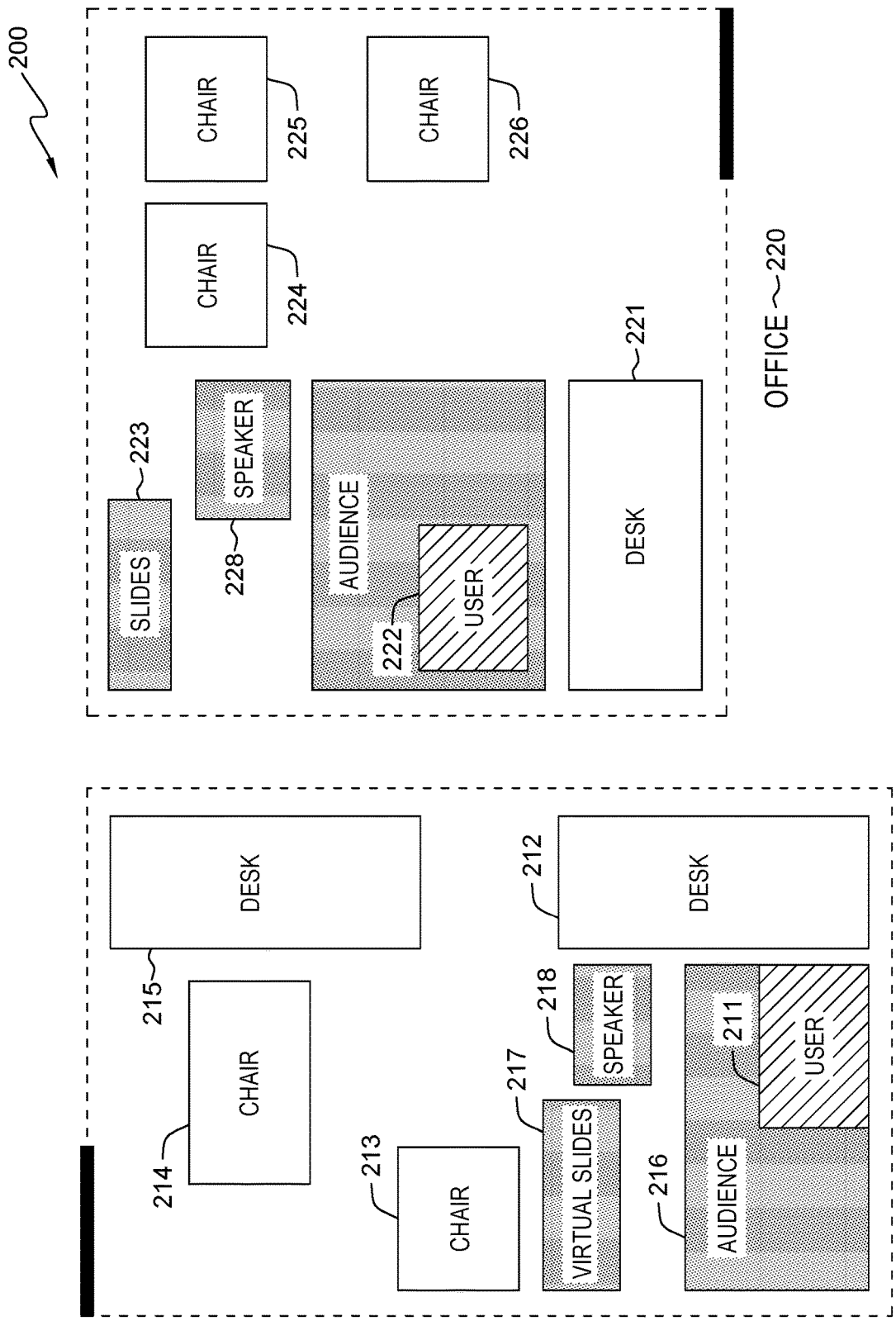
FIG. 2B is an example of virtual meeting optimization component in communication with the computing device, within the distributed data processing environment of FIG. 1, for determining where to place virtual meeting placeholders for a presentation style meeting, in accordance with an embodiment of the present invention.
Figure 2C:
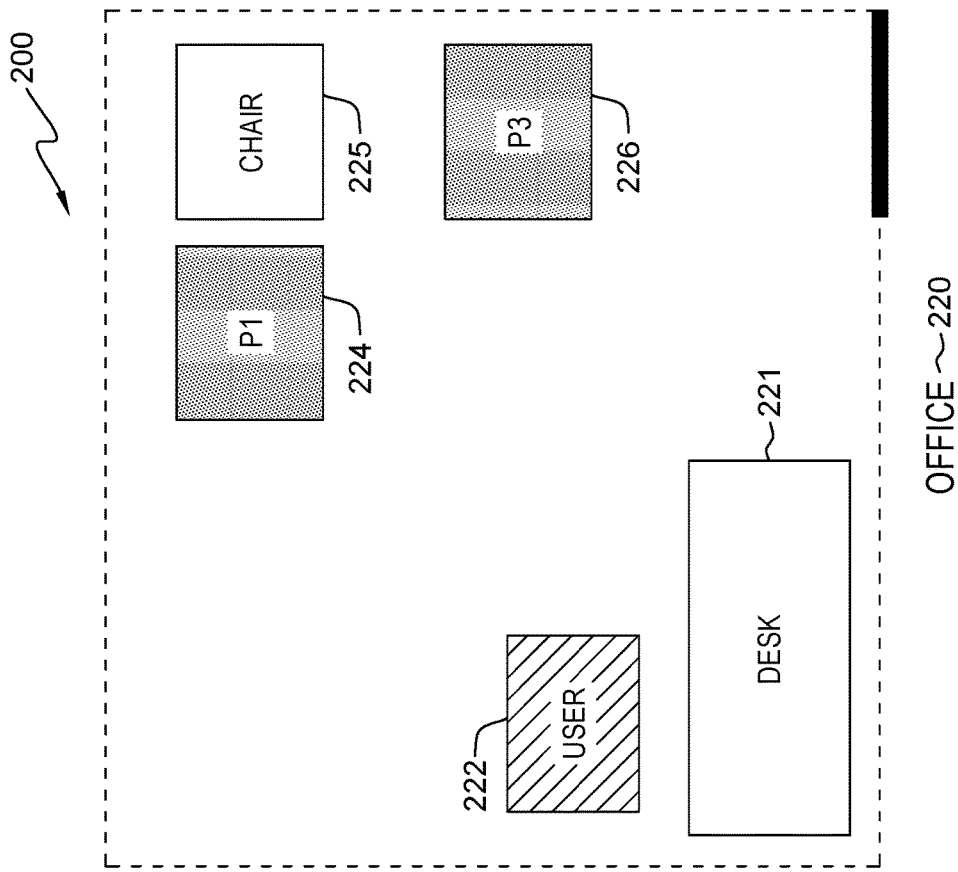
FIG. 2C is an example of virtual meeting optimization component in communication with the computing device, within the distributed data processing environment of FIG. 1, for determining where to place virtual meeting placeholders for a round-table open discussion style meeting, in accordance with an embodiment of the present invention.
Figure 2C:
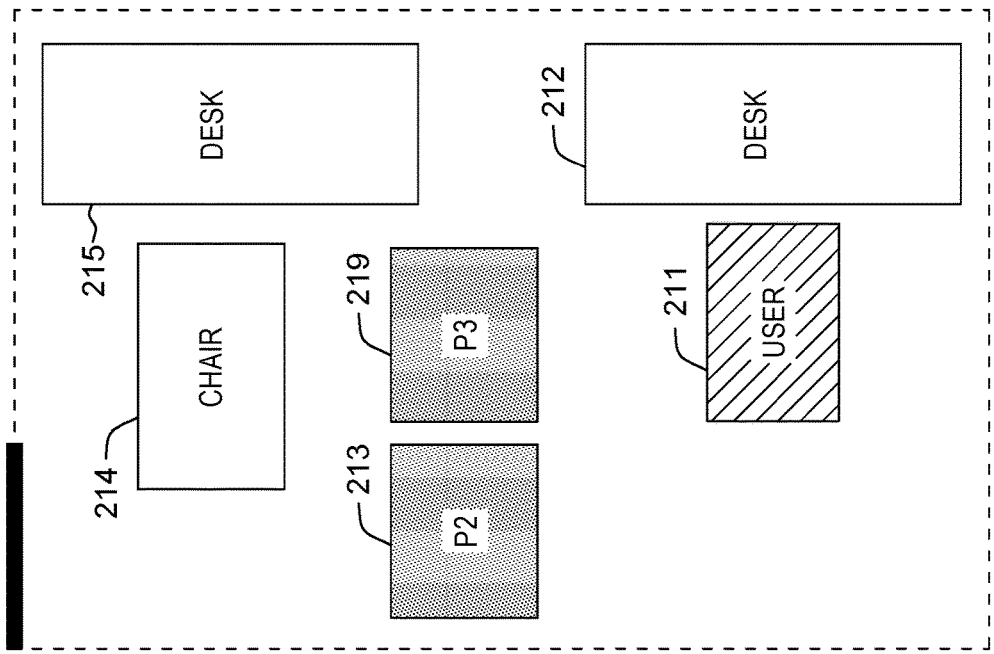

FIG. 2A illustrates an example of optimization component 112, generally designated 200, in communication with computing device 110, within distributed data processing environment 100 of FIG. 1, for identifying a physical room layout for each meeting attendee using an AR headset, in accordance with an embodiment of the present invention. FIG. 2A provides an illustration of one implementation and does not imply any limitations with regard to the environments in which different embodiments can be implemented. Many modifications to the depicted environment can be made by those skilled in the art without departing from the scope of the invention as recited by the claims.

In this particular example, while first user 211 and second user 222 each wear AR glasses, optimization component 112, via object detection in the camera of each of the users AR glasses, collects the layout and dimension of office 210 and office 220. Additionally, in this example, optimization component 112 retrieves the blueprints and other layout data for office 210 and office 220 from shared storage 124. In this example, optimization component 112 identifies, that in office 210, first user 211 is located next to desk 212, desk 212 and desk 215 are unacceptable locations because desk 212 and desk 215 are occupied with computer monitors, and that chair 214 is occupied with a person or object and that chair 213 is empty (i.e., unoccupied). In this example, optimization component 112 identifies, that in office 220, second user 222 is located next to desk 221, desk 221 is an unacceptable location because desk 221 is occupied with documents and books, chair 224, chair 225, and chair 226 are unoccupied, and that whiteboard 223 is available to virtual display presentation data (e.g., presentation slides).

FIG. 2B illustrates an example of optimization component 112, generally designated 200, in communication with computing device 110, within distributed data processing environment 100 of FIG. 1, for determining where to place virtual meeting placeholders for a presentation style meeting, in accordance with an embodiment of the present invention. FIG. 2B provides an illustration of one implementation and does not imply any limitations with regard to the environments in which different embodiments can be implemented. Many modifications to the depicted environment can be made by those skilled in the art without departing from the scope of the invention as recited by the claims.

In this particular example, optimization component 112 places placeholders in office 210 and office 220. In this example, optimization component 112 identifies, that in office 210, first user 211 location (next to desk 212), desk 212 and desk 215 are unacceptable locations, and that chair 214 is occupied and chair 213 is empty (i.e., unoccupied). Additionally, optimization component 112 optimally establishes audience 216, speaker 218, and virtual screen 217 as placeholders for office 210. In this example, optimization component 112 identifies, that in office 220, second user 222 location (next to desk 221), desk 221 is an unacceptable location, chair 224, chair 225, and chair 226 are unoccupied, and that whiteboard 223 is available to virtual display presentation data (e.g., presentation slides). Additionally, optimization component 112 optimally establishes audience 227, speaker 228, and whiteboard 223 as placeholders for office 220. In this example, office 220 the whiteboard 223 is used to project the presentation slides and in office 210 virtual screen 217 virtually displays the presentation slides.

In this example, optimization component 112 does not utilize any of the empty chairs because the speaker is standing. In this example, virtual chairs are rendered for the audience members because there are no empty chairs in front of the speaker.

FIG. 2C illustrates an example of optimization component 112, generally designated 200, in communication with computing device 110, within distributed data processing environment 100 of FIG. 1, for determining where to place virtual meeting placeholders for a round-table open discussion style meeting, in accordance with an embodiment of the present invention. FIG. 2C provides an illustration of one implementation and does not imply any limitations with regard to the environments in which different embodiments can be implemented. Many modifications to the depicted environment can be made by those skilled in the art without departing from the scope of the invention as recited by the claims.

In this example, user 211 and user 222 are participating in a round table discussion meeting with 3 total participants. In this example, optimization component 112 identifies user 211 as participant 1 (P1), desk 212 and desk 215 are unacceptable locations, chair 213, chair 214, and chair 219 are unoccupied. In this example, optimization component 112 places placeholders on chair 213 and chair 219. In this example, optimization component 112 virtually generates can displays participant 2 (P2) in chair 213 and participant (P3) in chair 219. In this example, optimization component 112 identifies user 222 as P2, desk 221 as an unacceptable location, chair 224, chair 225, and chair 226 as unoccupied. In this example, optimization component 112 places placeholders on chair 224 and chair 2226. In this example, optimization component 112 virtually generates can displays P1 in chair 224 and P3 in chair 226.

Figure 3:
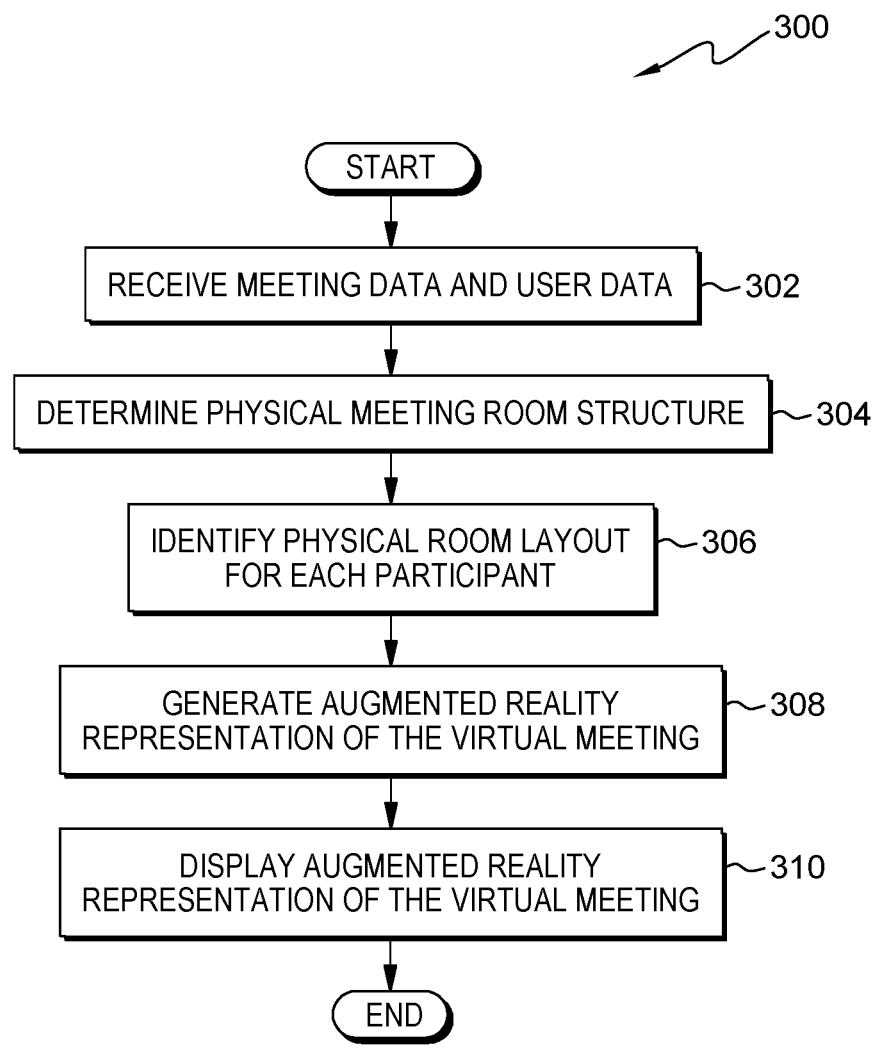
FIG. 3 illustrates operational steps of the virtual meeting optimization component, in communication with a computing device within the distributed data processing environment of FIG. 1, for augmented object layout in virtual meetings, in accordance with an embodiment of the present invention.

FIG. 3 illustrates operational steps of optimization component 112, generally designated 300, in communication with computing device 110, within distributed data processing environment 100 of FIG. 1, for augmented object layout in virtual meetings, in accordance with an embodiment of the present invention. FIG. 3 provides an illustration of one implementation and does not imply any limitations with regard to the environments in which different embodiments can be implemented. Many modifications to the depicted environment can be made by those skilled in the art without departing from the scope of the invention as recited by the claims.

In step 302, optimization component 112 receives meeting data and user data. In various embodiments of the present invention, optimization component 112 can operate as an application tool that is linked to a user's personal information management systems (PIMS) such as e-mail and calendar application, wherein optimization component 112 analyzes the users received e-mails. In various embodiments of the present invention, optimization component 112 can receive and/or retrieve meeting data and user data from the data collected from the PIMS.

In step 304, optimization component 112 determines physical meeting room structure. In various embodiments of the present invention, optimization component 112 can determine the physical meeting room structure by parsing and analyzing the received meeting invitation, via text analysis. Alternatively, a user can manually enter the physical meeting room structure.

In step 306, optimization component 112 identifies the physical room layout for each participant. In various embodiments of the present invention, optimization component 112 can receive video and/or photos from camera component 108 while a user is wearing and/or operating computing device 110. In various embodiments of the present invention, optimization component 112 can analyze the received video and/or photos to identify the physical room layout. In various embodiments of the present invention, optimization component 112 can identify the physical room layout by identifying the windows, doors, cabinets, and/or any unoccupied and occupied space (chairs, desks, wall, whiteboard, chalkboard, and open space in the office) in the physical room.

In step 308, optimization component 112 generates an augmented reality representation of the virtual meeting. In various embodiments of the present invention, optimization component 112 can generate an augmented reality representation of the virtual meeting that is tailored specifically for a user based on the identified physical room layout, the physical meeting room structure, and the meeting data and user data. In various embodiments of the present invention, optimization component 112 can execute an optimization algorithm using the identified physical room layout, the physical meeting room structure, and the meeting data and user data and compute an optimization score for each iteration output by the optimization algorithm.

In step 310, optimization component 112 displays the augmented reality representation of the virtual meeting. In various embodiments of the present invention, optimization component 112 can virtually display the tailored augmented reality representation of the virtual meeting in each user's physical room, via computing device 110. the augmented reality representation of the virtual meeting can dynamically adjust the tailored augmented reality representation of the virtual meeting.

Figure 4:
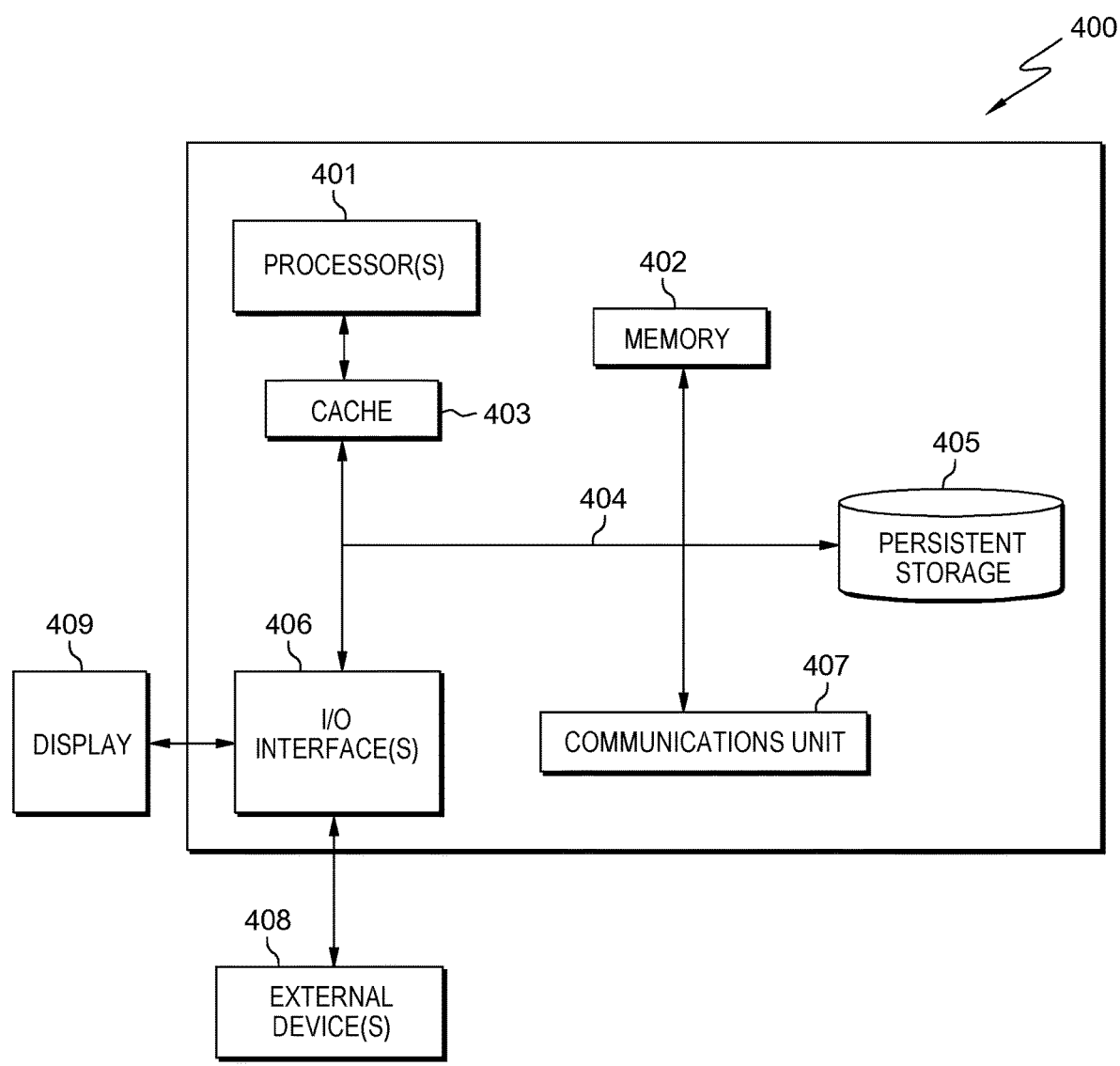
FIG. 4 depicts a block diagram of components of a computing device executing the virtual reconstruction tool within the distributed data processing environment of FIG. 1, in accordance with an embodiment of the present invention.

FIG. 4 depicts computer system 400, where computing device 110 represents an example of computer system 400 that includes optimization component 112. The computer system includes processors 401, cache 403, memory 402, persistent storage 405, communications unit 407, input/output (I/O) interface(s) 406, display 409, external device(s) 408 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention can be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 can also be removable. For example, a removable hard drive can be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 can provide communications through the use of either or both physical and wireless communications links. Program instructions and data used to practice embodiments of the present invention can be downloaded to persistent storage 405 through communications unit 407.

I/O interface(s) 406 enables for input and output of data with other devices that can be connected to each computer system. For example, I/O interface 406 can provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. I/O interface(s) 406 also connect to display 409.

Display 409 provides a mechanism to display data to a user and can be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention can be a system, a method, and/or a computer program product. The computer program product can include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, a segment, or a portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for virtual object placement in augmented reality environments, the computer-implemented method comprising:
   determining a physical meeting room structure based on the meeting data and user data;
   identifying, by an augmented reality device, a physical room layout in which a first user is located;
   determining an augmented room layout for the first user based on the identified physical room layout, wherein determining the augmented room layout comprises:
   executing an optimization algorithm; and
   computing an optimization score for each iteration of potential room layouts produced by the optimization algorithm, wherein a potential room layout receiving the highest optimization score is the augmented room layout;
   generating an augmented reality representation of a meeting environment tailored to the physical room layout based on the physical meeting room structure and the augmented room layout; and
   displaying to the first user the augmented reality representation of the meeting environment.

2. The computer-implemented method of claim 1, wherein identifying the physical room layout comprises:
   receiving videos and photos of a physical room viewed from the augmented reality device;
   receiving dimensions and blueprints of the physical room from the augmented reality device; and
   analyzing the received the videos, photos, dimensions, and blueprints.

3. The computer-implemented method of claim 1 further comprising:
   classifying a type of meeting for which the meeting environment is being used;
   wherein:
   the augmented room layout is further determined based on the type of meeting.

4. The computer-implemented method of claim 1 further comprising:
   identifying, by a second augmented reality device, a second physical room layout in which a second user is located;
   determining a second augmented room layout for the second user based on the second physical room layout;
   generating a second augmented reality representation of the meeting environment including a virtual image of the first user, the second augmented reality representation being tailored to the physical room layout; and
   displaying to the second user the second augmented reality representation of the meeting environment;
   wherein:
   the augmented reality representation displayed to the first user includes a virtual image of the second user.

5. The computer-implemented method of claim 1 further comprising:
   receiving an initial training set including sample meeting recordings with annotated physical structures;
   training a machine learning classifier to classify new meetings based on the initial training set, wherein the training comprises:
   automatically learning the structure of the meeting by monitoring meeting interactions between users over a predetermined period of time; and
   classifying meetings represented in the sample meeting recordings with corresponding meeting types based on the monitored interactions between the users.

6. The computer-implemented method of claim 1 further comprising:
   identifying physical locations within the physical room layout to place virtual attendees and presentation material in the augmented room layout using spatial mapping of the physical room layout, the meeting data, and the user data.

7. The computer-implemented method of claim 1 further comprising:
   dynamically displaying virtual attendees and virtual presentation material in the augmented reality representation of the meeting environment, wherein optimization component can dynamically adjust the displayed augmented reality representation; and
   dynamically changing a user's role when the user is speaking and/or interacting with presentation material.

8. A computer program product for virtual object placement in augmented reality environments, the computer program product comprising:

one or more computer readable storage devices and program instructions stored on the one or more computer readable storage devices, the stored program instructions comprising:
program instructions to determine a physical meeting room structure based on the meeting data and user data;
program instructions to identify, by an augmented reality device, a physical room layout in which a first user is located;
program instructions to determine an augmented room layout for the first user based on the identified physical room layout, wherein determining the augmented room layout comprises:
program instructions to execute an optimization algorithm; and
program instructions to compute an optimization score for each iteration of potential room layouts produced by the optimization algorithm, wherein a potential room layout receiving the highest optimization score is the augmented room layout;
program instructions to generate an augmented reality representation of a meeting environment tailored to the physical room layout based on the physical meeting room structure and the augmented room layout; and
program instructions to display to the first user the augmented reality representation of the meeting environment.

9. The computer program product of claim 8, wherein identifying the physical room layout comprises:
program instructions to receive videos and photos of a physical room viewed from the augmented reality device;
program instructions to receive dimensions and blueprints of the physical room from the augmented reality device; and
program instructions to analyze the received the videos, photos, dimensions, and blueprints.

10. The computer program product of claim 8 further comprising:
program instructions to classify a type of meeting for which the meeting environment is being used;
wherein:
the augmented room layout is further determined based on the type of meeting.

11. The computer program product of claim 8 further comprising:
program instructions to identify, by a second augmented reality device, a second physical room layout in which a second user is located;
program instructions to determine a second augmented room layout for the second user based on the second physical room layout;
program instructions to generate a second augmented reality representation of the meeting environment including a virtual image of the first user, the second augmented reality representation being tailored to the physical room layout; and
program instructions to display to the second user the second augmented reality representation of the meeting environment;
wherein:
the augmented reality representation displayed to the first user includes a virtual image of the second user.

12. The computer program product of claim 8 further comprising:
program instructions to receive an initial training set including sample meeting recordings with annotated physical structures;
program instructions to train a machine learning classifier to classify new meetings based on the initial training set, wherein the training comprises:
program instructions to automatically learn the structure of the meeting by monitoring meeting interactions between users over a predetermined period of time; and
program instructions to classify meetings represented in the sample meeting recordings with corresponding meeting types based on the monitored interactions between the users.

13. The computer program product of claim 8 further comprising:
program instructions to identify physical locations within the physical room layout to place virtual attendees and presentation material in the augmented room layout using spatial mapping of the physical room layout, the meeting data, and the user data.

14. The computer program product of claim 8 further comprising:
program instructions to dynamically display virtual attendees and virtual presentation material in the augmented reality representation of the meeting environment, wherein optimization component can dynamically adjust the displayed augmented reality representation; and
program instructions to dynamically change a user's role when the user is speaking and/or interacting with presentation material.

15. A computer system for virtual object placement in augmented reality environments, the computer system comprising:
one or more computer processors;
one or more computer readable storage devices;
program instructions stored on the one or more computer readable storage devices for execution by at least one of the one or more computer processors, the stored program instructions comprising:
program instructions to determine a physical meeting room structure based on the meeting data and user data;
program instructions to identify, by an augmented reality device, a physical room layout in which a first user is located;
program instructions to determine an augmented room layout for the first user based on the identified physical room layout, wherein determining the augmented room layout comprises:
program instructions to execute an optimization algorithm; and
program instructions to compute an optimization score for each iteration of potential room layouts produced by the optimization algorithm, wherein a potential room layout receiving the highest optimization score is the augmented room layout;
program instructions to generate an augmented reality representation of a meeting environment tailored to the physical room layout based on the physical meeting room structure and the augmented room layout; and
program instructions to display to the first user the augmented reality representation of the meeting environment.

16. The computer system of claim 15, wherein identifying the physical room layout comprises:
  program instructions to receive videos and photos of a physical room viewed from the augmented reality device;
  program instructions to receive dimensions and blueprints of the physical room from the augmented reality device; and
  program instructions to analyze the received the videos, photos, dimensions, and blueprints.

17. The computer system of claim 15 further comprising:
  program instructions to classify a type of meeting for which the meeting environment is being used;
  wherein:
  the augmented room layout is further determined based on the type of meeting.

18. The computer system of claim 15 further comprising:
  program instructions to identify, by a second augmented reality device, a second physical room layout in which a second user is located;
  program instructions to determine a second augmented room layout for the second user based on the second physical room layout;
  program instructions to generate a second augmented reality representation of the meeting environment including a virtual image of the first user, the second augmented reality representation being tailored to the physical room layout; and
  program instructions to display to the second user the second augmented reality representation of the meeting environment;
  wherein:
  the augmented reality representation displayed to the first user includes a virtual image of the second user.

19. The computer system of claim 15 further comprising:
  program instructions to receive an initial training set including sample meeting recordings with annotated physical structures;
  program instructions to train a machine learning classifier to classify new meetings based on the initial training set, wherein the training comprises:
    program instructions to automatically learn the structure of the meeting by monitoring meeting interactions between users over a predetermined period of time; and
    program instructions to classify meetings represented in the sample meeting recordings with corresponding meeting types based on the monitored interactions between the users.

20. The computer system of claim 15 further comprising:
  program instructions to identify physical locations within the physical room layout to place virtual attendees and presentation material in the augmented room layout using spatial mapping of the physical room layout, the meeting data, and the user data.

* * * * *